United States Patent [19]
White

[11] Patent Number: 5,734,794
[45] Date of Patent: Mar. 31, 1998

[54] METHOD AND SYSTEM FOR VOICE-ACTIVATED CELL ANIMATION

[76] Inventor: Tom H. White, 3126 Hollyridge Dr., Los Angeles, Calif. 90068

[21] Appl. No.: 493,652

[22] Filed: Jun. 22, 1995

[51] Int. Cl.$^6$ .................................................. G10L 9/06
[52] U.S. Cl. .................... 395/2.84; 395/2.44; 395/2.55; 395/2.69; 395/2.85
[58] Field of Search ............................ 395/2.44, 2.55, 395/2.57, 2.58, 2.62, 2.63, 2.69, 2.84, 2.85

[56] References Cited

U.S. PATENT DOCUMENTS

| | | | |
|---|---|---|---|
| 4,600,281 | 7/1986 | Bloomstein | 352/50 |
| 4,600,919 | 7/1986 | Stern | 340/725 |
| 4,642,710 | 2/1987 | Murtha et al. | 360/79 |
| 4,827,532 | 5/1989 | Bloomstein | 382/41 |
| 4,856,066 | 8/1989 | Lemelson | 381/36 |
| 4,884,972 | 12/1989 | Gasper | 434/185 |
| 5,111,409 | 5/1992 | Gasper et al. | 395/152 |
| 5,214,758 | 5/1993 | Ohba et al. | 395/164 |
| 5,261,041 | 11/1993 | Susman | 395/152 |
| 5,347,306 | 9/1994 | Nitta | 348/15 |
| 5,353,404 | 10/1994 | Abe et al. | 395/164 |
| 5,356,156 | 10/1994 | Suzuki et al. | 273/437 |
| 5,367,454 | 11/1994 | Kawamoto et al. | 364/419.2 |
| 5,377,319 | 12/1994 | Kitahara et al. | 395/161 |
| B1 4,600,919 | 9/1992 | Stern | 340/725 |

FOREIGN PATENT DOCUMENTS 920687  2/1973  Canada .................................. 340/164

OTHER PUBLICATIONS

Knowlton., Kenneth C..*Computer-Produced Movies*, 26 Nov. 1965, Science vol. 150, pp. 1116–1120.

*Primary Examiner*—Allen R. MacDonald
*Assistant Examiner*—Alphonso A. Collins
*Attorney, Agent, or Firm*—Carr, DeFilippo & Ferrell

[57] ABSTRACT

A computer based system utilizing cues extracted from audio speech to select from among a database of stored image cells to produce synthesized animated characters. A database of image cells is created by storing the face of an actor or other character articulating some 40 phoneme sounds, in 8 different emotions from 25 different camera angles. Audio speech is then analyzed and the faces are extracted based on phoneme sounds and emotion cues within the spectral information of the speech. The position of a user operated camera controller is polled to determine a desired camera angle and the three image parameters (articulation, emotion and camera angle) are used to select an image from the database associated with the phoneme. The selected images are interpolated to produce a smooth, life-like character or cartoon animation sequence, and then stored to a video recorder.

22 Claims, 13 Drawing Sheets

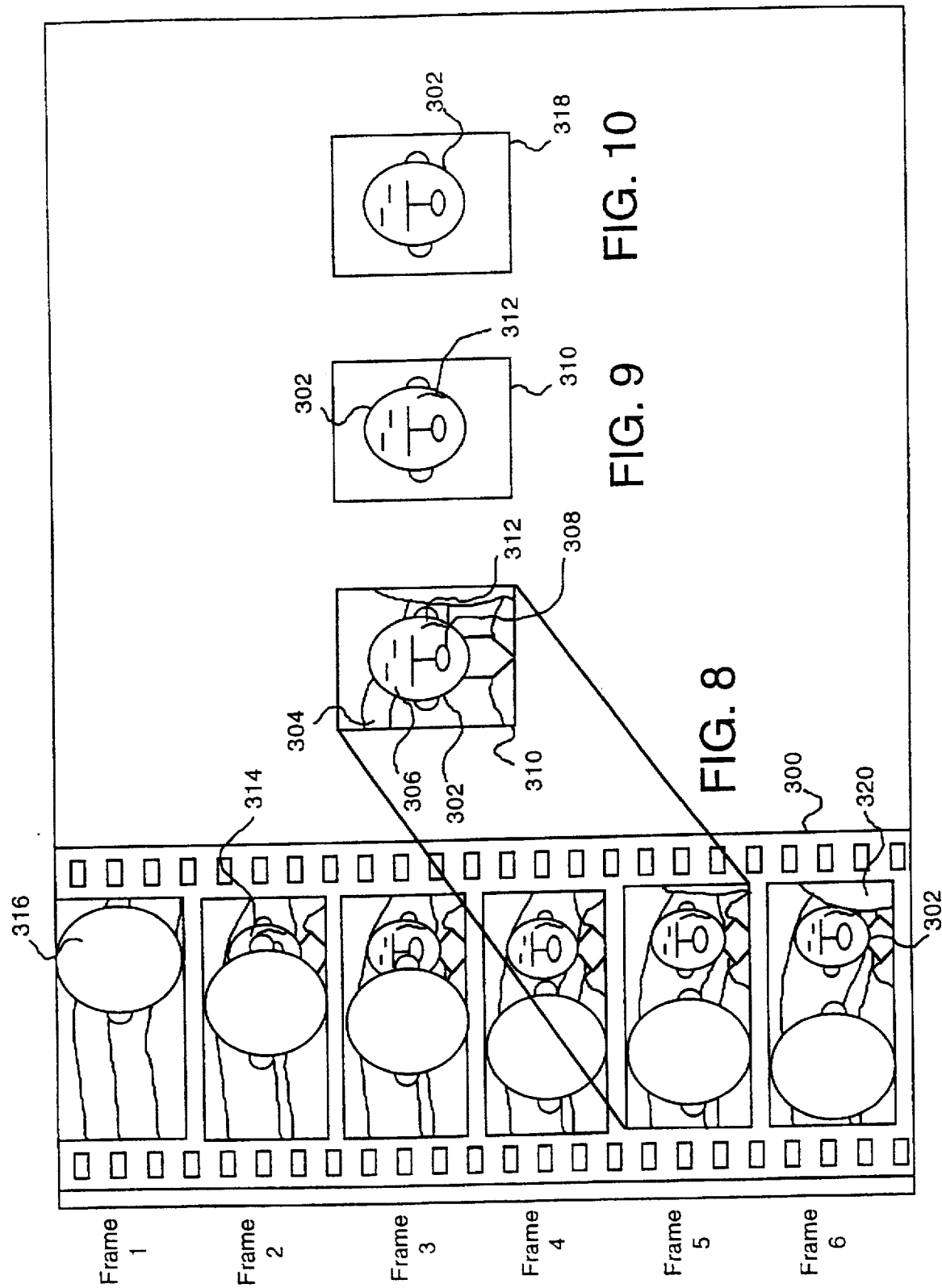

METHOD AND SYSTEM FOR VOICE-ACTIVATED CELL ANIMATION

BACKGROUND OF THE INVENTION

1. Field of the Invention

The present invention relates generally to the field of video animation and more specifically to the field of video animation based on the selection of image cells from a computer database.

2. Description of the Background Art

In general terms, animation is the sequencing of fixed images to create the visual effect of motion. Animation has been widely used in the production of motion pictures, the generation of science fiction movies and in cartoons for television. A common historical method used in animating figures and animals is the technique of stop-action animation. A figure such as a dinosaur is modeled in clay and photographed against a suitable background. The position of the figure is then slightly changed and re-photographed. This process of re-positioning and photographing is repeated to produce a photographic sequence which, when viewed frame-by-frame in rapid succession, produces an effect of animation. A similar process is used to produce animated cartoons. A sequence of drawn and painted graphic cells are produced and photographed in sequence to provide the effect of motion. A significant cost in producing animated motion pictures is generating the large number of flames required for even a short animated sequence. With motion picture animation requiring 12-24 still image flames per character per second, and video animation requiring 12-30 frames more than a quarter of a million image frames must be generated for a full length motion picture. The availability of computers in the last several decades has resulted in many improvements in the quality and producibility of animated motion pictures.

In U.S. Pat. No. 5,111,409 by Gasper et al., a computer program is described for synchronizing phonetic codes with synthesized speech and visual images. For example, a phrase is typed into a computer running the computer program, and a voice synthesizer recites the words of the typed text while a synchronized animated character changes its position in order to appear as though the words are being spoken. The efficiencies of producing a video sequence using this system can be significant when compared to cell-by-cell production, since the synchronization between the phonemes comprising the recited text and the lip position images is automated. However, the user must manually make changes to the characters facial features to adjust the emotion and head position. The problem with this and other previous techniques is that the realistic rendering of facial expressions with recited speech is much more complex than merely changing lip position with each of the various phonetic articulations. The interplay between emotion and articulation can be quite dramatic. For instance, the spoken word "no" creates one facial expression in the phrase "I don't know", and a distinctly different facial expression when used in the imperative, "NO!". In order to achieve high quality animation, the facial changes which occur as a function of emotion must also be considered. What is needed is an automated system for producing high quality animation which enables automatic selection of individual image cells based on both phonetic and emotional content.

SUMMARY OF THE INVENTION

The present invention is a computer-based system and method for automated, voice-activated animation. The function of the present invention is to enable a user to generate an animated video sequence using a collection of video cells that are automatically synchronized to an audio input. As an example of the use of the present invention, a database is created of cell images of a particular actor whose image will be animated. In order to create the database of image cells, video or film is examined and individual frames showing different facial features used in articulating speech are collected, organized and stored using digital storage techniques. Alternatively, a character can be specially photographed or drawn with the required facial features. The various facial features which are stored include phoneme expressions which result in different lip positions, as well as various emotions expressed in the eyes, cheeks and mouth, which are commonly displayed by the actor. In addition to these features relating to speech articulation, multiple camera angles are also stored in order to add realism to the animation. Control over the camera angle enables the actor's face to be viewed from one of the two sides as well as from above and below. The database consists of still images of the actor reciting up to 40 different phonemes, with 8 different emotions, using 25 different camera angles.

The film sequences which are examined in producing the database, are preferably reviewed on a video playback source, such as Beta SP, D1 or laser disc. Once the images are chosen, the original film image, or the video version of that image is digitized and stored in a general purpose computer. The computer is connected to a display terminal and a keyboard having a trackball pointing device. An emotion selector is used to define emotions being expressed by the actor and to enable the selection of database image cells corresponding to these emotions. A camera control is also connected to the keyboard, and is used to introduce the effect of camera positioning in creation of the animation.

Once the database of image cells is created, the auto animation system can then be used to produce an animated video sequence as follows. A voice actor reads a script into a microphone and the actor's voice is recorded by an audio recorder. The recorded speech is then transferred to the computer where the speech is divided into phonetic units called phonemes. These phonemes are then individually evaluated by the computer to extract both phoneme identification information (phoneme cues) as well as emotion information. The phoneme cues define the position of the actors lips and jaw as the phonetic syllable is being spoken. The emotion information utilizes frequency content and amplitude of the signal to identify the emotional state of the speech. The user can select a camera angle using the camera control. By adjusting the camera control, the apparent relationship between the actor's face and the view changes, simulating the effect of a camera moving with respect to an actor. From the phoneme and camera angle, the computer searches the image cell database and displays the single image cell associated with the camera angle, the phoneme being spoken, and the emotional state of the actor identified by the computer. Zoom buttons located on the camera control can be used to make the image smaller or larger on the display terminal.

As each image cell is selected, the cell is displayed on the video display and can be examined by the user. With use of a high performance computer system, conversion of the speech audio source to phonemes and the subsequent cell selection can occur at or about the video viewing rate of 30 frames-per-second. The user can measurably control camera angle "real-time", panning or moving the camera control and thus adjusting the viewers perspective just as the movie director would move a camera. As the camera angle control is moved, cells are selected which represent the varying camera angle head positions. The user also has control over the actors emotions. Emotion cues are automatically extracted from the audio input source, according to default values set for typical speech. The user can view the images displayed for the audio input source as it is translated to video, and select emotion values using the emotion control. The emotion control enables the system to learn by storing spectral (signal frequency and amplitude) values for the speech being translated as the emotion control selection is made. This enables the system to extract equivalent emotion cues for future audio passages having similar spectral constituents.

Once the automatic cell translation is completed, the user can then manually review and edit individual cells, replacing cells which might have been inappropriately translated. As part of the manual editing process, adjacent cells can be interpolated (morphed) to create smoother transitions between facial expressions. This morphing process eliminates jerkiness which might result from sudden changes in camera angle or actor emotion. The edited animated sequence is then stored as an output to the video recording source.

BRIEF DESCRIPTION OF THE DRAWINGS

FIG. 8 illustrates a pictorial diagram showing a film sequence in the selection of a single frame in creating a database in the present invention;

FIG. 9 shows the selected film frame of FIG. 8 illustrating the background removal using the cell editor of the present invention;

FIG. 10 shows the image frame of FIG. 9 indicating the removal of artifacts in the present invention;

DETAILED DESCRIPTION OF THE PREFERRED EMBODIMENTS

Figure 1:
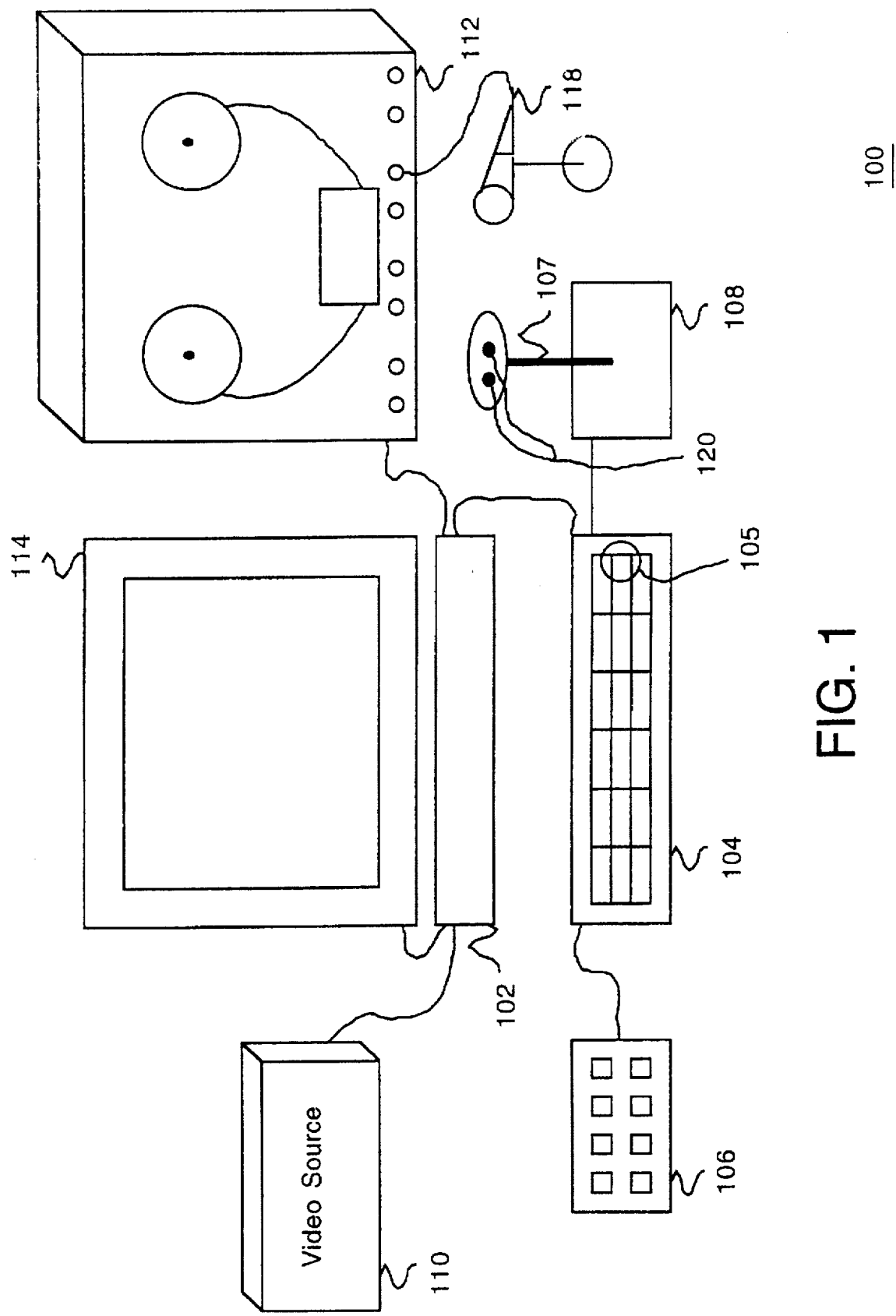
FIG. 1 illustrates a schematic diagram of the auto animation system of the present invention.

Referring now to FIG. 1, a schematic diagram is shown of the auto animation system 100 of the present invention. The function of the present invention is to enable a user to generate an animated video sequence using a collection of video cells which are automatically synchronized to an audio input. As an example of the use of the present invention, a database is created of image cells of a particular actor whose image will be animated. It is possible, of course, for more than one actor or character to undergo image animation using the auto animation system 100. However for simplicity, the following discussion will be limited to the use of a single actor. In order to create the database of image cells, film footage is examined and individual frames showing different facial features used in articulating speech are collected, organized and stored using digital storage techniques. The various facial features which are stored include phoneme expressions, which result in different lip positions, as well as various emotions and facial characterizations which are commonly displayed by the actor. In addition to these features relating to speech articulation, multiple camera angles are also stored in order to add realism to the animation. Control over the camera angle enables the actor's face to be viewed from the front, either of the two sides, and from above and below.

The film sequences which are examined in producing the database, are preferably played on video source 110, such as a VCR, and then digitized and stored in computer 102. Computer 102 is preferably a high-end computer such as a Macintosh computer manufactured by Apple Computer of Cupertino, Calif., or SGI workstation manufactured by Silicon Graphics of Mountain View, Calif. Equivalently, any high-end general purpose computer would be suitable to practice the present invention. The computer 102 is connected to a display terminal 114 and a keyboard 104. A trackball 105 is shown built into keyboard 104, however, any suitable pointing device could also be used. Other features of the auto animation system 100 include an emotion selector 106 which is shown generally attached to the keyboard 104. This emotion selector 106, used in automatic or manual mode, defines emotions being expressed by the actor and enables the selection of database image cells corresponding to these emotions. A camera control 108 is shown also connected to the keyboard 104 and is used to introduce the effect of camera positioning in creation of the animation.

Once the database of image cells is created, the auto animation system 100 can be used to produce an animated video sequence. A voice actor reads a script into microphone 118 and the actor's voice is recorded as audio input by audio recorder 112. Audio recorder 112 is preferably a high quality tape storage machine or other audio storage device. The audio input is then transferred to the computer 102 where the speech is divided into phonetic units called phonemes. These phonemes are then individually evaluated by computer 102 to extract both phoneme identification information (phoneme cues) as well as emotion information (emotion cues). The phoneme cues define the position of the actors lips and jaw as the phonetic syllable is being spoken. The emotion cues are based on the frequency response and amplitude of the signal using conventional signal processing techniques, and identify the emotional state of the speech. From the phoneme and emotion cues, the computer 102 searches the image cell database and identifies the image cells associated with both the phoneme being spoken and the emotional state of the actor identified by the computer 102. In the preferred embodiment, a series of image cells having the specific phoneme and emotion are stored, each image cell representing a distinct camera angle. The user can adjust the camera control 108 in order to select a desired apparent camera angle of the image for display on display terminal 114. By adjusting the camera control 108, the apparent relationship between the actor's face and the viewer changes, simulating the effect of a camera moving with respect to an actor. When the joystick 107 of the camera control 108 is pushed forward, the azimuth or elevation of the camera angle increases, thus having the apparent effect of the viewer looking down onto the actor from above. By pulling back on the joystick 107, the camera elevation is lowered until the viewer looks up into the face of the actor. By moving the joystick 107 to the right, the camera appears to move to the right, and the left side of the face of the actor can be viewed. Similarly, by moving the joystick 107 to the left, the right side of the actor's face can then be viewed. Zoom control 120 generally located on the joystick 107 can be used to make the image smaller or larger on the display terminal 114. This zoom control 120 has the affect of having the camera zoom in or zoom out on the actor being displayed.

The auto animation system 100 of the present invention can be used in a variety of ways. The auto animation system 100 can be utilized to produce movies featuring actors who never existed, existed but are no longer living or living but not presently working. Such a "virtual actor" movie would be produced using "body" actors to walk through the scenes making the body and positional movements. Voice actors will then produce the audio component, impersonating the vocal characteristics of the actor being animated. The present auto animation system 100 can then be used to animate facial images of the virtual actor speaking the script. Using conventional digital film augmentation techniques, the animated faces of the virtual actors can then be composited onto the faces of the body actors who are doing the positional acting work. An alternative use of the present invention is to extend the idea of auto animation to include not only facial expressions, but also body expressions where the entire body of a particular actor can be produced. Although this alternative embodiment is presently limited by the cost of computer memory, full body animation is well within the scope and intention of the present invention.

Figure 2:
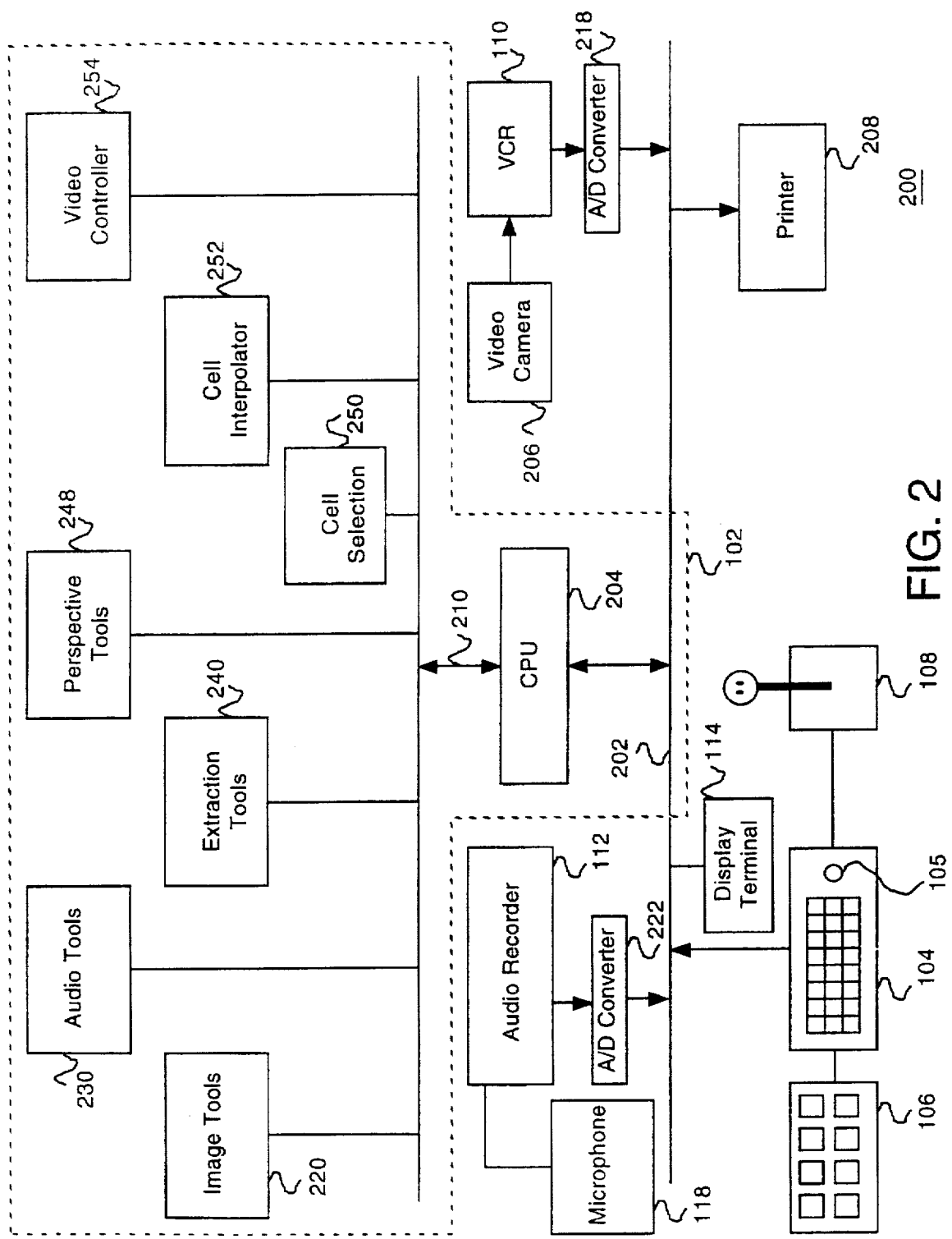
FIG. 2 illustrates a schematic diagram of the auto animation system of the present invention including an architectural diagram of the computer in FIG. 1.

Referring now to FIG. 2, the computer architecture 200 of computer 102 shown in FIG. 1 is illustrated. The computer 102 is constructed around a CPU 204 connected to a variety of memories and peripherals using a conventional von Neuman architecture. CPU 204 connects to the keyboard 104 and display terminal 114 through I/O bus 202. Also connected to the I/O bus 202, is the audio recorder 112 which couples to the I/O bus 202 through an A/D converter 222. If the audio recorder is an analog system, the purpose of the A/D converter 222 is to convert analog signals of the audio recorder 112 into a digital format which can be read and processed by the CPU 204. A microphone 118 is used to collect the analog signals for recording by the audio recorder 112. Also connected to the keyboard 104, are the emotion selector 106 and the camera control 108. A keyboard trackball 105 is shown generally constructed into the keyboard 104. Also connected to the I/O bus 202 is a video source 110. The video source 110 is also connected to the I/O bus 202 through an A/D converter 218. Again, the purpose of this A/D converter 218 is to convert the analog signals from the video source 110 to digital signals which can be read and processed by the CPU 204. Preferably, a video camera 206 is connected to the video source 110 for collecting film sequences for use in the animation process. Optionally, a printer 208 can be connected to the I/O bus 202 for use in making a permanent record of data which is processed and stored by the CPU 204. The CPU 204 is connected to a plurality of memories through databus 210. The memories connected to databus 210 are used for storage of data and for the storage of application programs which run on the CPU 204. Memories and applications which are connected to databus 210 include image tools 220, audio tools 230, extraction tools 240, perspective tools 248, a cell selector 250, a cell interpolator 252, and a video controller 254. The image tools 220 are used to receive and edit various images which are collected from the video source 110 and converted to database cells for storage by the CPU 204. Audio tools 230 are used to receive, filter and otherwise process audio input from audio recorder 112 for storage by the CPU 204. Extraction tools 240 are used to analyze the audio source input from audio recorder 112 and to generate signals relating to phoneme and emotion information in order to select appropriate cells in the animation process. Perspective tools 248 are used to control camera angle in conjunction with camera control 108. Cell selector 250 is used to receive information from the extraction tools 240 and the perspective tool 248 and to select the appropriate image cell from the image tools memory 220. Cell interpolator 252 is an application program which is used to compare the image between two adjacent cells and to interpolate and create smooth motion between these cells, giving the viewer the sense of fluid animation. Video controller 254 is used by the CPU 204 to control the reading and storage of data to the video source 110.

Figure 3:
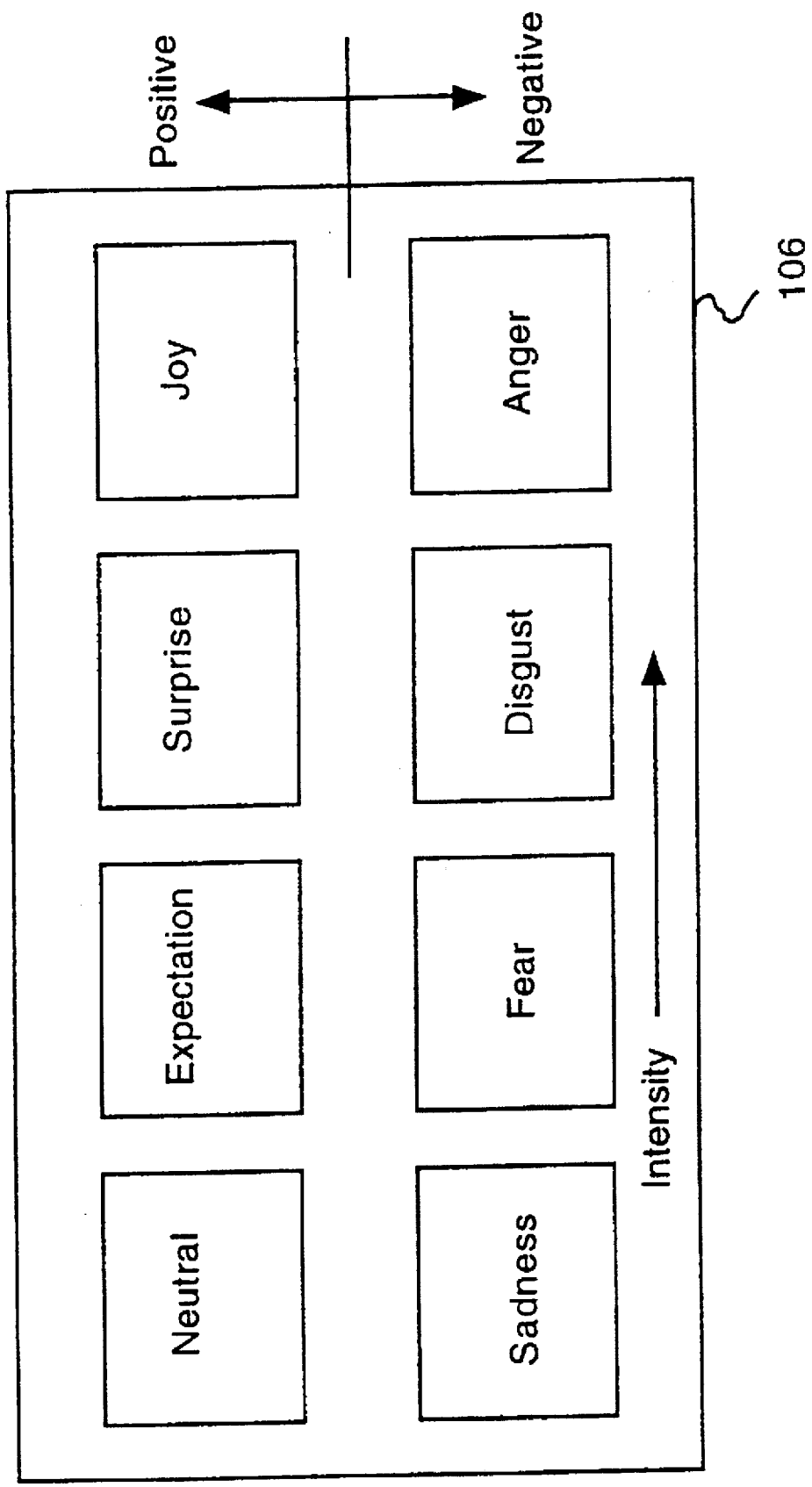
FIG. 3 shows a pictorial diagram of the emotion selector of FIG. 1 of the present invention.

Referring now to FIG. 3, a detailed diagram is shown of the emotion selector 106 which is connected to the keyboard 104. The emotion selector 106 preferably comprises eight buttons which are used to define emotions being expressed in speech transferred from the audio recorder 112 to the CPU 204. As each phoneme is extracted by extraction tools 240, an appropriate image cell is displayed on display terminal 114. The CPU 204, using the extraction tools 240, attempts to determine which of the eight emotions (anger, disgust, expectation, fear, joy, sadness, surprise and neutral) most closely matches the expression of the speech. More or fewer emotions can alternatively be determined. This matching is made by the extraction tools 240, using a combination of frequency response and amplitude of the phoneme signal coming from the audio recorder 112. As the user views the image cell for the particular phoneme on the display terminal 114, the user can select one of the eight buttons on the emotion selector 106 to define the emotion being displayed. For instance, if the emotion being displayed is one of elation, the joy button can be pressed and the corresponding joy image cell for the phoneme being pronounced will be displayed on display terminal 114. Once the selection of the joy emotion is made manually or automatically, the CPU 204, as directed by the extraction tools 240, will recognize the phoneme frequency response and amplitude of the cell being displayed as that of the joy emotion. Once recognized, subsequent units of audio input having similar frequency response and amplitude constituents will also be designated as having the joy emotion. In actual practice, emotion can be selected with the emotion selector 106 at close to normal viewing speed. Since emotions are changed somewhat infrequently during the course of a short segment of video sequence, the user can watch the sequence as it develops and plays out in the video display terminal 114 and as required, can press different emotion buttons to change the displayed emotion image of the actor. To enhance to the useability of the emotion selector 106, the buttons are arranged so that the positive emotions (neutral, expectation, etc.) are on the top row of buttons, and the negative emotions are arranged on the bottom row of buttons. Furthermore, the emotion buttons are also arranged such that the intensity of the emotion increases from left to right. Neutral and sadness are low intensity emotions, having buttons on the far left of the emotion selector 106. The emotions of joy and anger are high intensity emotions, having buttons on the far right of the emotion selector 106.

Figure 4:
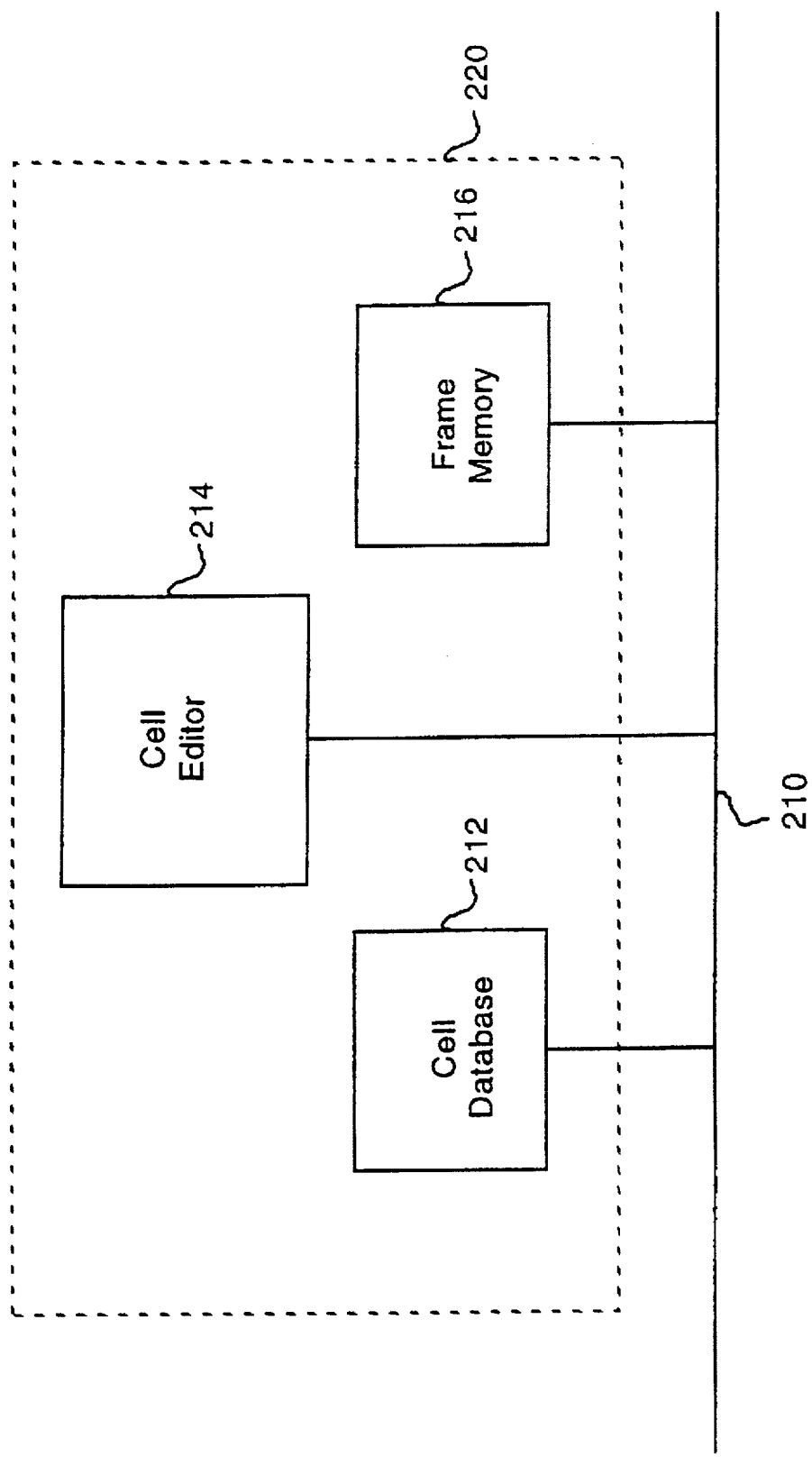
FIG. 4 shows a schematic block diagram of the image tools of FIG. 2.

Referring now to FIG. 4, a detailed diagram of the image tools 220 is shown. Image tools 220 is preferably comprised of three separate components. One component of the image tools 220 is the Frame Memory 216 which is the initial image storage location for a frame of video information transferred from video source 110 through the CPU 204. This Frame Memory 216 contains raw video information in a format that can be used in the sequencing of these image frames. These image frames are then converted using the cell editor 214 into a cell database 212 which comprises an ordered three-dimensional matrix of filtered image cells. In the preferred embodiment, the cell database 212 contains a three-dimensional x, y, z matrix of faces of an actor. For each actor, the x-axis database contains a face shape having the mouth articulations of 40 phonemes, with each phoneme representing the facial expression produced when the particular phoneme syllable is articulated. For each of the 40 phonemes on the y-axis, the cell database also contains image cells representing the eight different emotions discussed with respect to FIG. 3. These eight emotions include neutral, anger, disgust, expectation, fear, joy, sadness, and surprise. The third dimension, or z-axis is camera angle, represented by image cells contained in cell database 212. For each of the 320 (8 emotions and 40 phonemes) emotion and phoneme image cells, 25 different camera angles are stored. The purpose for storing this many camera angles is to enable the facial images to be viewed from a variety of different positions, thus adding realism to the finished video image product. The cell editor 214 is implemented using a commercially available product such as Adobe Photoshop or Specular Infini-D. The function of the cell editor 214 is to enable manipulation of the digital cell by removing artifacts and background components from the image frames and for filtering and adjusting the hue, color, contrast and brightness of the frame in order to equalize the image cells within the cell database 212. It should be noted that the cell editor 214 does not necessarily need to reside on the auto animation system 100, but alternatively could exist on a remote computing device. In fact, once created, the cell database 212 can be easily ported from one auto animation system 100 to another.

Figure 5:
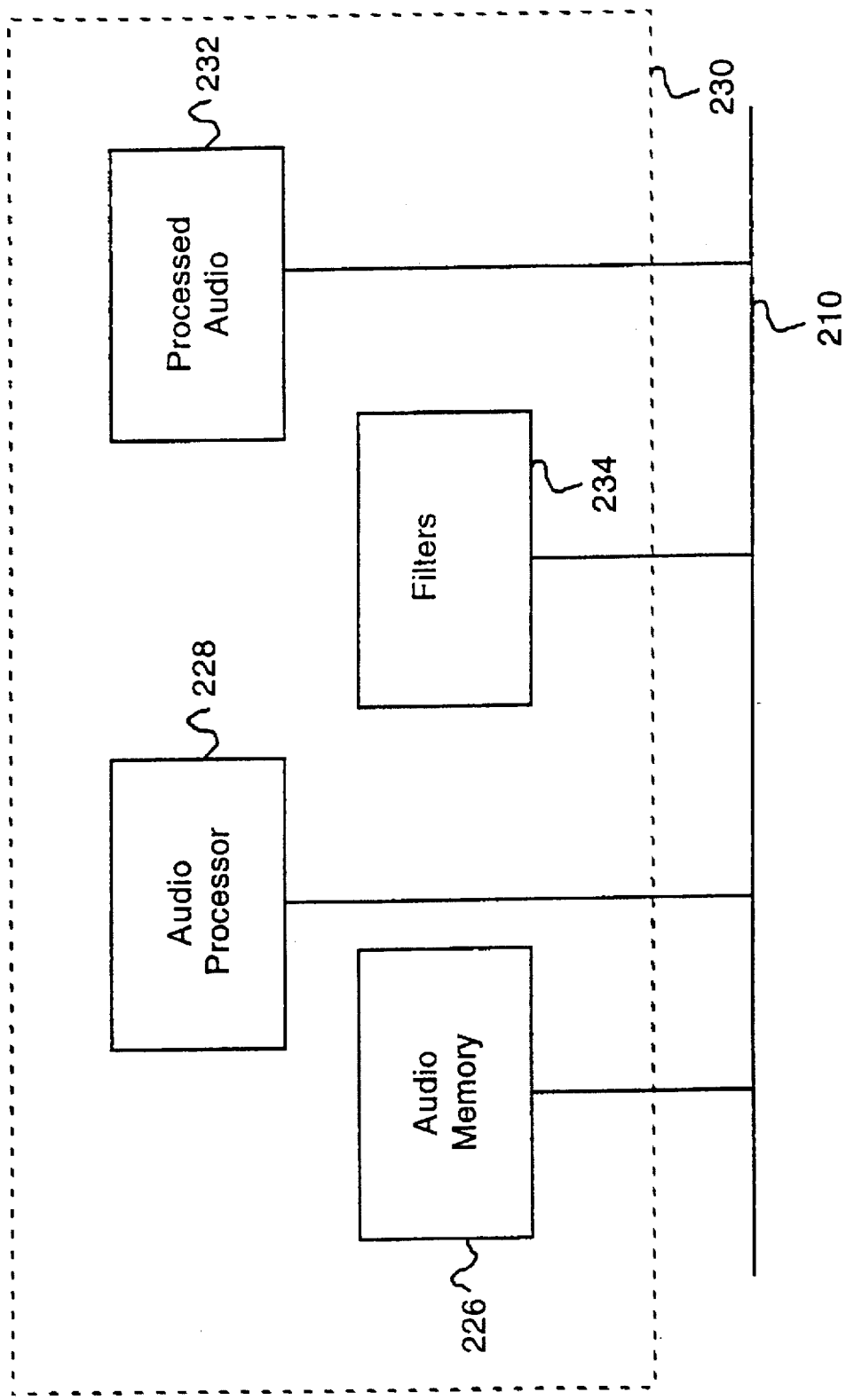
FIG. 5 shows a schematic block diagram detailing the audio tools of FIG. 2.

Referring now to FIG. 5, audio tools 230 are shown coupled to databus 210. The function of audio tools 230 is to receive the speech from the audio recorder 112 which has been digitized by A/D converter 222, and to filter and process the speech for use by the extraction tools 240. The digitized speech from A/D converter 222 is initially stored in audio memory 226. This stored speech from audio memory 226 is then analyzed and processed by audio processor 228. Preferred functions of audio processor 228 include the equalization of the stored speech relative to a standard recording level, removal of background noise using filters 234, and the filtering of other artifacts which may complicate phonetic analysis of this stored speech. The digital filtering techniques which comprise the filter 234 are conventional and well known by those in the art. Once processing of the stored speech by audio processor 228 is completed, the speech is then stored in processed audio memory 232.

Figure 6:
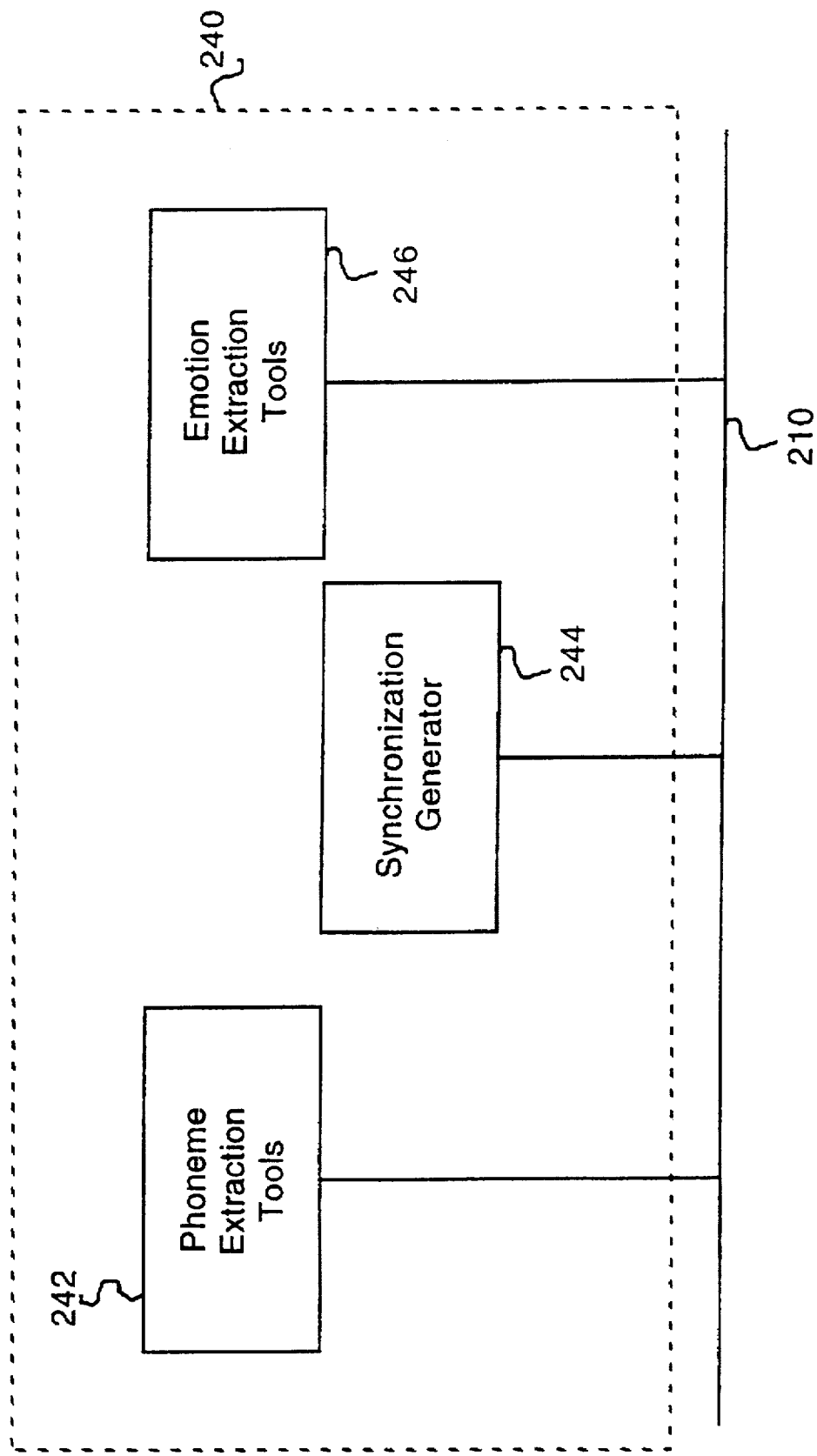
FIG. 6 shows a block diagram illustrating the extraction tools of FIG. 2 of the present invention.

Referring now to FIG. 6, the extraction tools 240 are shown coupled to the databus 210. The extraction tools consist of three major components, phoneme extraction tools 242, a synchronization generator 244 and emotion extraction tools 246. The function of the phoneme extraction tools 242, is to parse the digitized speech into a series of separate speech articulations. These articulations (phonemes) represent the basic sounds made by the human voice while reciting the words which comprise speech. For example, the phrase "all good boys do fine", generally comprises the phonemes AWL GU D BOEEZ DU F I N. Each of these phonemes, which comprise the phrase "all good boys do fine", represent a different facial expression, many of which must be articulated when pronouncing the speech. Each phoneme creates a different movement of the jaw, mouth and lips and results in a different facial expression of the actor in reciting the speech. The phoneme extraction tools 242 are conventional tools and well known by those who practice in the art. The synchronization generator 244 produces a timing signal at the occurrence of each phoneme extracted from the stored speech. The synchronization generator 244 enables the visual display of an image cell which relates to the phoneme being produced simultaneously with the articulation of the speech. Synchronization generation is also conventional and described in the U.S. Pat. No. 5,111,409.

The emotion extraction tools 246 analyze the phoneme produced by phoneme extraction tools 242 and attempt to characterize the phoneme by its spectral response, including the frequency content of this recorded speech as well as the amplitude of the various spectral components. The function of the emotion extraction tools 246 is to attempt to identify the emotional state of the actor while the actor is reciting the phoneme extracted in 242. The emotion extraction tools 246, for instance, might relate a high amplitude, high frequency response with the emotion of anger. When the emotion extraction tools 246 receive a phoneme of speech, the speech is analyzed with respect to frequency and amplitude. A phoneme emotion pattern is produced which relates the articulation of a specific phoneme with a set of spectral characteristics. These spectral characteristics are compared to a set of stored emotion templates contained within the emotion extraction tools 246. When a match is found with a stored template, the specific emotion pattern can be related and coded to a specific emotion. The emotion extraction tools 246 can utilize input from the emotion selector 106 to create and update the templates relating to the various emotions. The user, for instance, can relate the articulation of a specific phoneme to a specific emotion by pressing one of the buttons on the emotion selector 106. The emotion extraction tools 246 then create and store a template relating that emotion to the particular emotion pattern identified with the particular phoneme. All further phonemes which have a similar emotion pattern as that of the stored template will be tagged with the same emotion. In the course of identifying the emotional content of stored speech, the emotion extraction tools 246 initially make a best guess based on default stored templates. However, as discussed above, the default stored templates can then be replaced with user created templates.

The tag or code which relates a specific emotion (anger, joy, surprise, etc.) to an emotion pattern is referred to as an emotion cue. The identification of a specific phoneme with a specific unit of speech is referred to as a phoneme cue. The extraction tools 240 produce a phoneme cue, a synchronization timing signal, and an emotion cue for each of the phonemes articulated in the speech. These various signals are then transmitted back to the CPU 204 for use in selecting the appropriate image cell corresponding to the articulated phoneme.

Figure 7:
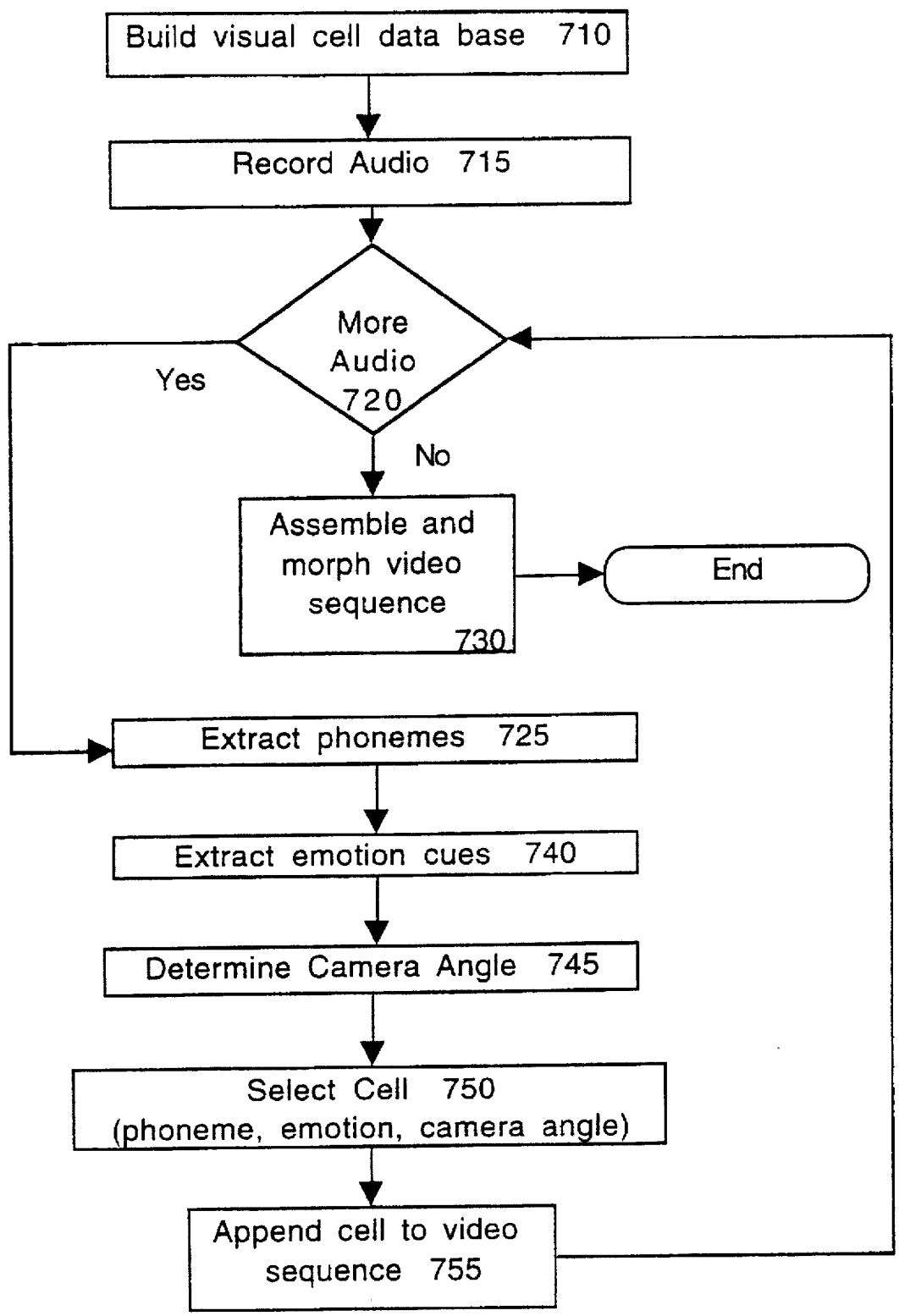
FIG. 7 shows a flow diagram of the preferred method of the present invention.

Referring now to FIG. 7, the preferred method steps of the present invention are shown as a flow chart for producing animated video sequences using the auto animation system 100. The method in accordance with the present invention begins with the building 710 of the visual cell database 212 containing facial expressions of the actor to be animated. The cell database 212 consists of still images of the actor reciting 40 different phonemes, with eight different emotions, and using 25 different camera angles. Once the cell database 212 is constructed, a script is prepared and a voice actor reads the script into microphone 118 where the speech is recorded 715 at audio recorder 112. Once the speech is recorded 715, the audio recording is digitized in A/D converter 222, filtered and processed using audio tools 230. The stored recorded audio is first tested in step 720 to determine whether additional stored text remains. If all text has been processed, assembly and morphing 730 of the video sequence is initiated. If additional, unextracted speech remains, processing continues with phoneme extraction in step 725. In step 725, the speech is broken into a sequence of phonetic constituents called phonemes, using the phoneme extraction tools 242. These phonemes are then analyzed with respect to spectral content and amplitude in emotion extraction tools 246 to extract emotion cues 740. Once the phoneme and emotion cues are extracted, the camera control 108 is polled to determine 745 the camera angle at which the actor is to be viewed. These three parameters, (phoneme cue, emotion cue and camera angle) are then used to select 750 the corresponding image cell from the cell database 212, of the actor articulating the desired phoneme. As each image cell is selected, the cell is appended 755 to the previously selected cell and the process repeats at step 720 until all of the recorded speech has been analyzed.

With the use of a high speed computer 102, conversion of the speech audio source to phonemes and the subsequent cell selection can generally occur at the video frame rate of 30 frames per second. The user can control camera angle "real-time", or program the moves according to corresponding motion controlled backgrounds. The user can pan, move or zoom the camera control 108 and thus adjusting the viewers perspective, just as the movie director would move a camera. As the camera control 108 is adjusted, cells from the cell database 212 are selected which represent the varying camera angle head positions of the actor. The variable zoom control 120 on the camera control 108, instructs the video display terminal 114 to project all or less of an entire image cell.

Once the automatic cell translation is completed, the user can then manually review and edit individual cells using display terminal 114, replacing image cells which might have been inappropriately translated. As part of the manual editing process, adjacent cells can be interpolated as needed to create smoother transitions between facial expressions using a conventional cell interpolator 252. This morphing 730 process eliminates jerkiness which might result from sudden changes in camera angle or actor emotion. The edited animation sequence is then stored as an output to the video source 110.

Referring now to FIG. 8, a pictorial diagram is shown of a film sequence 300 consisting of six frames of movie film used in building the cell database 212. Sequence 300 consists of a conversation between two individuals. The actor 314 is being partially blocked by head 316. As the sequence progresses from frame 1 to frame 6, the camera is slowly panning from left to right, enabling a clear view of the actor in frame 5. In frame 6, a foreground element 320 partially obstructs the view of the actor's face 302. Frame 4 does not contain the foreground element 320, however, the actor's face 302 is slightly blocked by head 316. Since frame 5 has the clearest view of the actor's face 302, the frame is selected and transferred from the video source 110 to the image tools 220. Frame 5 is then stored in the frame memory 216 where cell editor 214 is used to prepare the image for addition to the cell database 212. Once the film frame 310 is selected, the cell editor 214 is used to remove any background elements 304. The considerations in choosing the appropriate film frame 310 include the appropriate mouth expression 308 for the phoneme being expressed, as well as the facial expression 306 relating to a specific emotion intended to be represented.

Referring now to FIG. 9, the film frame 310 of FIG. 8 is shown having had the background elements 304 removed using the cell editor 214. In addition to removal of the background elements 304, the foreground element 320 was also erased, leaving only the face 302. The cell editor 214 is then used to remove artifacts 312 and other shadows which appear on the face 302. In addition, skin color is adjusted and picture tone is balanced to compensate for lighting and other filtering which may have occurred in recording of the film frame 310. Once the film frame 310 is edited, the face 302 as shown in FIG. 10 is stored as an image cell 318 in cell database 212.

Figure 11:
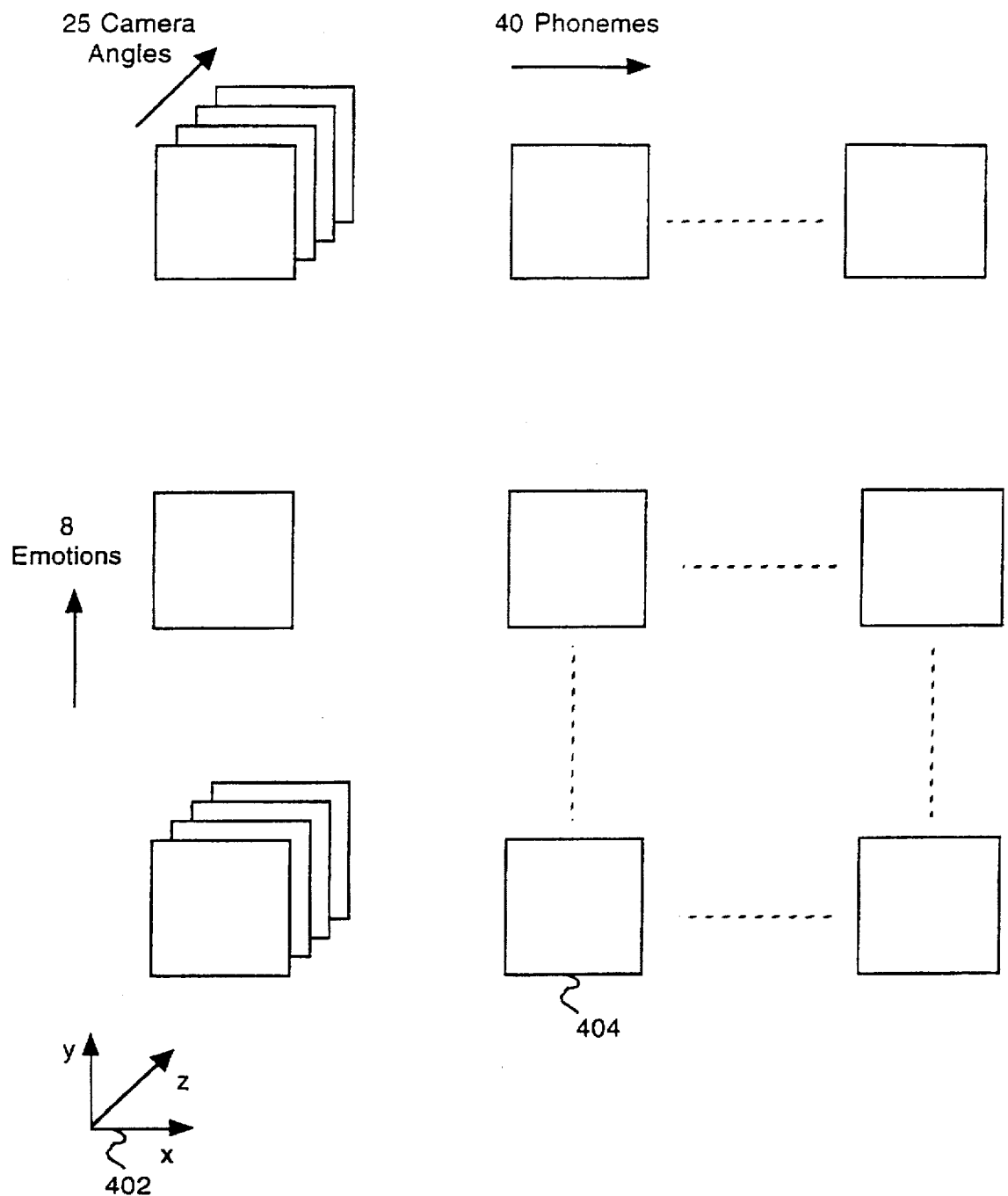
FIG. 11 is a pictorial diagram illustrating the three dimensional data structure contained within the cell database of the present invention.

Referring now to FIG. 11, a block diagram is shown illustrating the data structure of cell database 212. The cell database 212 can be thought of as a three-dimensional database of image cells 318 organized along three different parameters. These parameters can best be considered with reference to the coordinate space 402 defining an x, y, and z axis, as a three dimensional coordinate system. Cell database 212 maps image cells 318 according to phoneme cues along the x axis. These phoneme cues, as discussed above, represent the 40 different vocalized sounds that are used to articulate human speech. Each memory storage space 404 which lies along this x axis, represents a storage location for housing an image cell 318. This image cell 318 may be stored in any conventional picture format, however, the cell 318 is preferably stored using one of many highly efficient compression algorithms. While the storage of image cells 318 representing various phoneme cues is organized along the x axis, the y axis is organized according to the various emotions cues. The z axis contains information relating to various camera angles. Preferably 25 camera angles are used, however, alternative embodiments having greater or fewer camera angles are also possible. With a greater number of camera angles, motion and movement of the actors can be made more realistic. However, since each cell requires a significant allocation of storage space, the overall utilization of storage space increases geometrically with the increasing number of camera angles. Representation of the cell database 212 using coordinate space 402 as shown in FIG. 11, simplifies the visualization and understanding of the present invention. However, it should be understood that the actual storage of data in the present invention is sequential, using conventional memory addressing.

Figure 12:
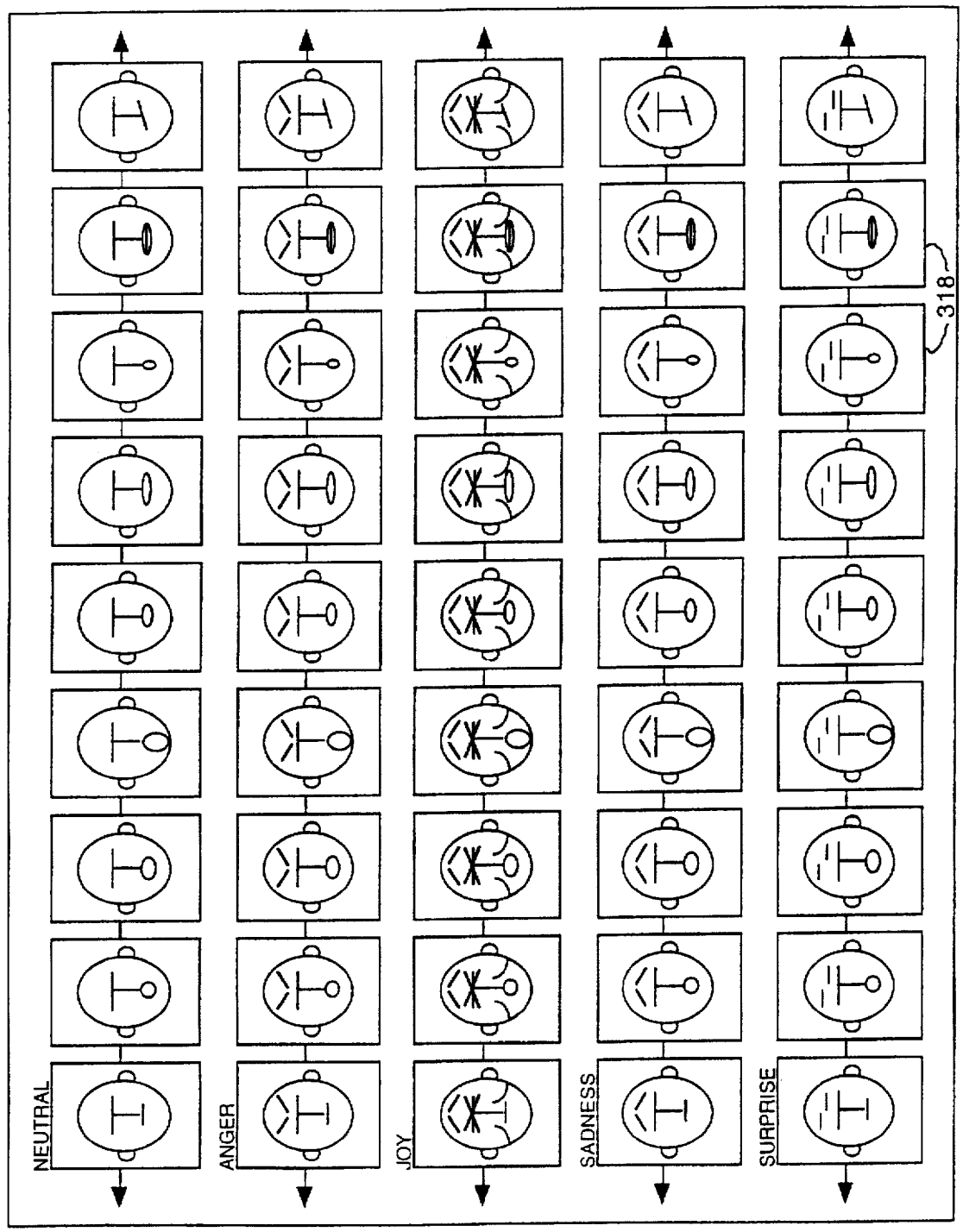
FIG. 12 shows a pictorial table illustrating the various emotion parameters of the present invention.

Referring now to FIG. 12, a pictorial table is shown portraying some of the various emotion cues represented along the x and y axes in coordinate space 402. The emotions represented in FIG. 12 include acceptance, anger, joy, sadness, and surprise. For each of the various emotion cues, a sequence of image cells 318 is shown, each representing a different phoneme used in the animation process of the present invention. For instance, the first row of cells shown in FIG. 12 comprises image cells 318, representing the various phonemes which would be articulated by the actor 314 expressing the emotion of acceptance. Each of the image cells 318 of the acceptance emotion are characterized by similar facial features. The most significant change which is exhibited between image cells 318 of the same emotion is the change in the formation of the lips which are shaped to articulate the various phoneme sounds. Other minor facial variations may occur between phonemes, such as variations in jaw, face wrinkles, etc. In creating the cell database 212 for a specific actor, it is necessary to convert film frames 310 into image cells 318 for each image cell contained in the cell database. For a cell database 212 containing 8 emotions, 40 phonemes and 25 camera angles, it is necessary to identify, filter and store 8,000 separate image cells 318.

Figure 13:
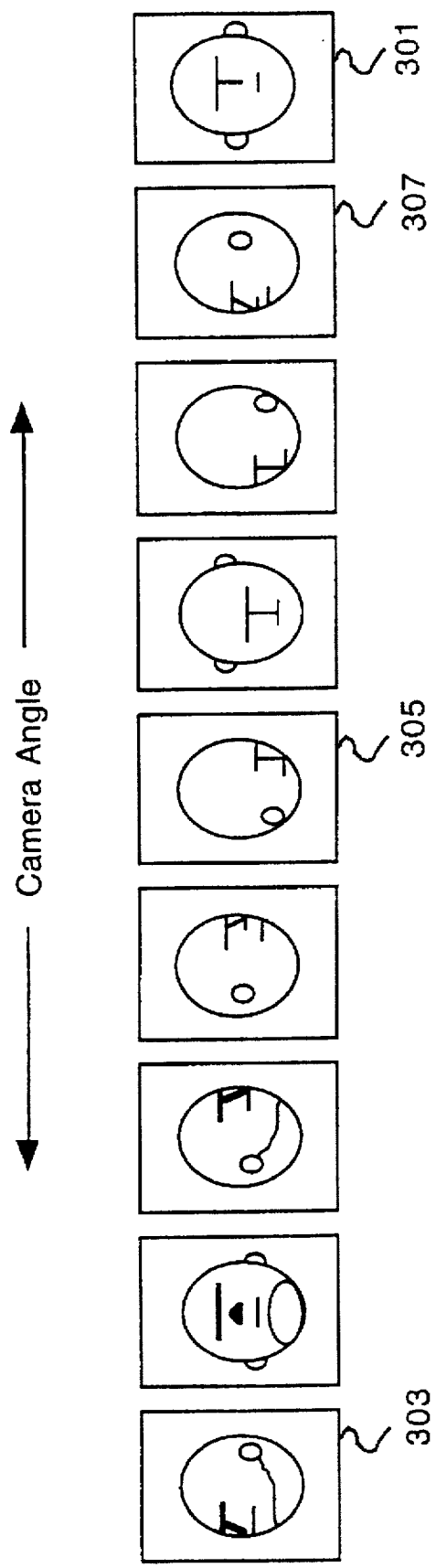
FIG. 13 shows various camera angles illustrating camera movement and data storage along the Z axis as implemented in the present invention.
Figure 14:
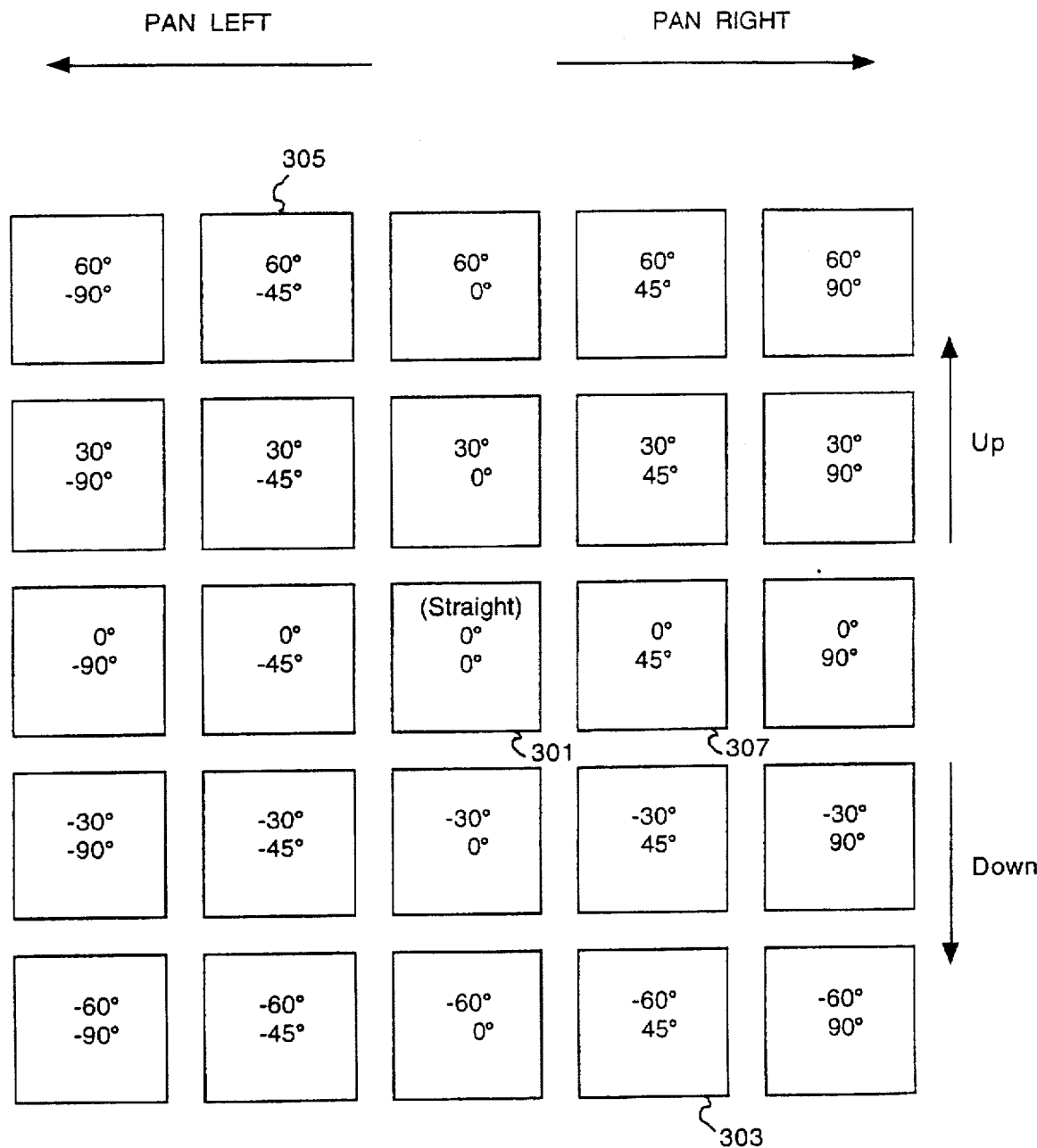
FIG. 14 represents a table illustrating camera angle adjustment using the camera control of the present invention.

Referring now to FIG. 13, various camera angles are shown representing camera movement and data storage along the z axis of coordinate space 402. By storing various camera angles of the actor's face 302, realistic animation of actor movements can be achieved. Referring also to FIG. 14, a matrix is shown of the 25 preferred camera angles collected and stored in the cell database 212. In the center of the matrix, a straight face shot 301 is shown as being similar to face 302, recorded and extracted in FIG. 10. The elevation (up/down) of the camera is 0° relative to the face, and the angle of the camera relative to the face is also 0°. The image cell of the straight face shot 301 is shown in FIG. 13. As the camera pans to the right, the elevation remains at 0°, however the camera angle increases from 45° (image cell 307 in FIG. 13) to 90° as panning continues from the straight shot of 0°, 0°. As the camera pans to the left of the straight shot, the elevation remains 0°, however, the camera angle decreases from –45° to –90°. Likewise, as elevation changes from the straight shot of 0°, 0°the elevation increases to 30° and then to 60°. An elevation of 60° is generally sufficient for most film work since very few shots are taken directly overhead of a speaking actor. Image cell 305 of FIG. 13 show the perspective of a face photographed at 60°, –45°. Likewise, as elevation decreases relative to the straight shot, the elevation decreases from 0°, to –30° and then to –60°. Again, 60° is generally sufficient for most camera work with speaking actors. Image cell 303 of FIG. 13 shows the perspective of a face photographed at –60°, 45°. Note that although the elevation changes to a maximum of plus or minus 60°, the pan angle traverses a total of 180° from –90° to 90°. This wider range of travel enables animation of two people facing each other having a conversation, in which the viewer observes them both from the side.

Figure 15:
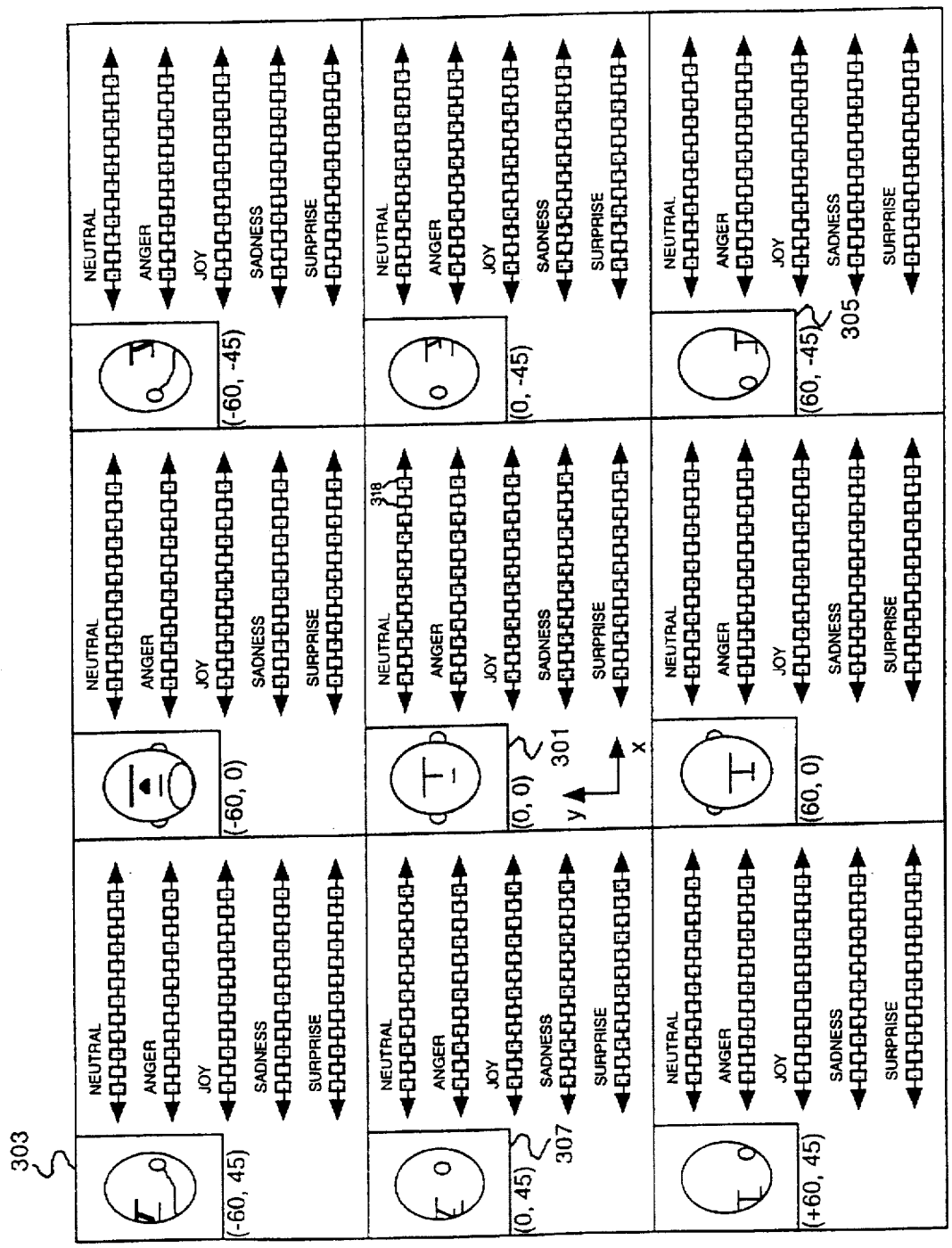
FIG. 15 shows a pictorial overview of the data structure contained within the cell database.

Referring now to FIG. 15, a graphic overview of the cell database 212 is shown, in which the three-dimensional cell database 212 is represented as a collection of two-dimensional blocks. At the center of the block is a straight shot of the face 301 having a camera angle of 0° elevation and 0° angle (0°, 0°). For each of the straight faces 301 shown in the center block is a matrix of image cells 318 as shown in FIG. 12. Along the y axis, emotions range from acceptance through surprise, and along the x axis faces representing each of the various phonemes are contained. A substantial cost of the present invention is that in order to achieve truly lifelike animation, a significant amount of film must be analyzed in order to extract the 8,000 or so cells necessary to create the cell database 212. In fact, if the goal of animating a particular actor is to animate someone who is no longer alive, sequences containing phoneme and camera angle representations of some of the cells within the database may not be available. In this case, it is necessary to interpolate between existing image cells 318 within the cell database 212 in order to create missing image cells. For instance, certain phoneme expressions for anger may not be available for a specific actor. Furthermore, for this specific emotion, only certain camera angles may be available for many of the phonemes. The cell editor 214 may be used to make changes to various existing cells in order to create missing cells. An example of this is that for the anger emotion a 60° shot may not be available for the phoneme "A", however, the phoneme "A" may be available for the sad emotion. Changes can be made using cell editor 214 to copy facial expressions from other phoneme image cells 318 in the anger category to the target sad cell of the desired phoneme, creating the phoneme having the anger expression characteristics. Systematically, the entire database can be completed even though film sequences for each of the emotions, phonemes and camera angles may not be otherwise available.

While the present invention has been described with reference to certain preferred embodiments, those skilled in the art will recognize that various modifications may be provided. For example, modifications might include, adding special effect textures, colors, aging treatments, lighting or other physical elements (a third eye) as needed to modify the physical characteristics of the actor. Also, the actor database can be merged or morphed with other images like a lion face to recreate the cowardly lion from the Wizard of Oz without the use of masks and make-up on actors. Also, elements from various actors can be combined to create a non-existent actor or personage. These and other variations upon and modifications to the preferred embodiment are provided for by the present invention which is limited only by the following claims.

What is claimed is:

1. A computer-based method for animating images, the method comprising the steps of:

receiving audio speech;

extracting emotion cues from the audio speech;

identifying image cells from a database of image cells according to the extracted cues; and sequencing the identified image cells to correspond to the audio speech.

2. The method according to claim 1, further comprising the step of extracting phonetic cues from the audio speech.

3. The method according to claim 1, wherein the received audio speech is from a recorded source.

4. The method according to claim 1, further comprising the steps of receiving a camera angle signal and combining said camera angle signal with the extracted emotion cues for use in identifying cells from the cell database.

5. The method according to claim 1, further comprising the step of receiving emotion control signals which override the extracted emotion cues from the audio.

6. The method according to claim 5, further comprising the step of storing the received emotion control signals for use in extracting emotion cues from the audio speech.

7. The method according to claim 1, wherein the database of image cells is organized according to an ordering of extracted cues.

8. The method according to claim 7, wherein the ordering of extracted cues is according to emotion, phonetics and camera angle.

9. The method according to claim 1, the method further comprising the step of interpolating the sequenced image cells to produce smooth transitions between said sequenced cells.

10. The method according to claim 1, further comprising the step of creating the database of image cells by scanning sequences of video frames.

11. A system for animating images, the system comprising:
- means for receiving audio speech;
- means for extracting emotion cues from the audio speech;
- means for identifying image cells from a database of image cells according to the extracted cues; and
- means for sequencing the identified image cells to correspond to the audio speech.

12. The system according to claim 11, further comprising means for extracting phonetic cues from the audio speech coupled to the means for identifying, in order that phonetic cues may be combined with emotion cues and used for identifying image cells.

13. The system according to claim 11, further comprising means for receiving a camera angle signal said camera angle signal with the extracted emotion cues for use in identifying cells from the cell database.

14. The system according to claim 11, further comprising means for receiving emotion control signals which override the extracted emotion cues from the audio speech.

15. A computer-based system for animating images, the system comprising:
- a database of stored image cells;
- an audio source containing recorded audio speech;
- audio tools having criteria for extracting cues from the audio speech;
- a processor coupled to the audio tools and to the database for selecting stored image cells in response to cues extracted by the audio tools; and
- a video recorder coupled to the processor for sequentially storing image cells selected by the processor.

16. The system according to claim 15, wherein the database of image cells is arranged according to cues defined by the audio tools.

17. The system according to claim 15, wherein the cues comprise emotion information.

18. The system according to claim 17, wherein the emotion information further comprises relative amplitude data.

19. The system according to claim 17, wherein the emotion information further comprises frequency response data.

20. The system according to claim 17, further comprising an emotion control input coupled to the processor for defining the emotion cues extracted by the audio tools.

21. The system according to claim 15, wherein the cues comprise phoneme information.

22. The system according to claim 15, further comprising a control input coupled to the processor for providing perspective cues to the processor, which cues define a viewing angle corresponding to at least one of said image cells.

* * * * *